(12) United States Patent
Knutson et al.

(10) Patent No.: US 12,117,296 B2
(45) Date of Patent: Oct. 15, 2024

(54) SYSTEM AND METHOD FOR DETERMINING MOVEMENT OF A VEHICLE BASED ON INFORMATION REGARDING MOVEMENT OF AT LEAST ONE OTHER VEHICLE

(71) Applicant: Aptiv Technologies AG, Schaffhausen (CH)

(72) Inventors: Eric Paul Knutson, Kokomo, IN (US); David Martin Spell, Kokomo, IN (US); Linh Pham, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 35 days.

(21) Appl. No.: 17/070,871

(22) Filed: Oct. 14, 2020

(65) Prior Publication Data
US 2022/0113137 A1   Apr. 14, 2022

(51) Int. Cl.
*G01C 21/16* (2006.01)
*G05D 1/00* (2024.01)
*G08G 1/00* (2006.01)

(52) U.S. Cl.
CPC ............. *G01C 21/16* (2013.01); *G05D 1/027* (2013.01); *G05D 1/028* (2013.01); *G08G 1/20* (2013.01)

(58) Field of Classification Search
None
See application file for complete search history.

(56) References Cited

U.S. PATENT DOCUMENTS

| | | | |
|---|---|---|---|
| 10,042,359 | B1 | 8/2018 | Konrardy et al. |
| 11,187,793 | B1 * | 11/2021 | Liu ........................ G01S 17/931 |
| 2018/0015922 | A1 | 1/2018 | Mcnew |

(Continued)

FOREIGN PATENT DOCUMENTS

| | | |
|---|---|---|
| CN | 104240535 A | 12/2014 |
| CN | 107221197 A | 9/2017 |

(Continued)

OTHER PUBLICATIONS

Extended European Search Report for Application No. EP 21 20 0539 dated Feb. 23, 2022.

(Continued)

*Primary Examiner* — Rachid Bendidi
*Assistant Examiner* — Selena M Jin
(74) *Attorney, Agent, or Firm* — Harness, Dickey & Pierce, P.L.C.

(57) ABSTRACT

An illustrative example embodiment of a method of processing information regarding movement of a first vehicle based on information regarding movement of at least one second vehicle includes: receiving a communication from the second vehicle that includes information regarding movement of the second vehicle, determining that the movement of the second vehicle corresponds to movement of the first vehicle, identifying at least one feature of the movement of the second vehicle that indicates an environmental condition that affects the movement of the second vehicle, identifying a sensor indication of movement of the first vehicle that corresponds to the feature of the movement of the second vehicle, and excluding the identified sensor indication from information used to determine movement of the first vehicle.

14 Claims, 2 Drawing Sheets

(56) References Cited

U.S. PATENT DOCUMENTS

| | | | |
|---|---|---|---|
| 2018/0190125 A1* | 7/2018 | Hayee | G08G 1/167 |
| 2018/0240335 A1* | 8/2018 | Dong | G08G 1/0112 |
| 2019/0130765 A1* | 5/2019 | Tulpule | G08G 1/22 |
| 2019/0164363 A1* | 5/2019 | Javid | G07C 5/0808 |
| 2019/0383638 A1* | 12/2019 | Cho | G05D 1/0295 |
| 2020/0042013 A1* | 2/2020 | Kelkar | H04W 4/46 |
| 2020/0192403 A1* | 6/2020 | Silver | G01S 13/956 |
| 2020/0207371 A1 | 7/2020 | Dougherty et al. | |
| 2020/0276977 A1* | 9/2020 | Saleh | B60W 50/0098 |
| 2021/0229657 A1* | 7/2021 | Herman | B60W 30/09 |
| 2022/0042819 A1* | 2/2022 | Bonnet | G08G 1/0141 |
| 2022/0113137 A1 | 4/2022 | Knutson et al. | |
| 2023/0259826 A1* | 8/2023 | Bonfigt | G06N 20/00 |
| | | | 702/189 |

FOREIGN PATENT DOCUMENTS

| | | | | |
|---|---|---|---|---|
| CN | 107798914 A | | 3/2018 | |
| CN | 109839283 A | | 6/2019 | |
| CN | 110782684 A | | 2/2020 | |
| CN | 111641927 A | | 9/2020 | |
| GB | 2558382 A | * | 7/2018 | A01K 97/125 |

OTHER PUBLICATIONS

Chinese Office Action regarding Patent Application No. 202111191963.0, dated Nov. 10, 2023.

Second Chinese Office Action regarding Application No. 202111191963, dated Apr. 8, 2024.

* cited by examiner

SYSTEM AND METHOD FOR DETERMINING MOVEMENT OF A VEHICLE BASED ON INFORMATION REGARDING MOVEMENT OF AT LEAST ONE OTHER VEHICLE

BACKGROUND

Modern automotive vehicles include an increasing amount of electronic technology, such as sensors or detectors that provide driver assistance or autonomous vehicle control. Information regarding the movement or heading direction of the vehicle is useful or necessary for such assistance or control. There are various ways to obtain such information. For example, a dead reckoning technique based on an inertial measurement unit (IMU) indication of vehicle movement is useful under some circumstances. There are situations in which the sensor information used for dead reckoning may be influenced by environmental conditions, such as variations in a road surface or strong winds. Those conditions can cause a change in the movement of the vehicle, which affects the accuracy of the IMU information used for determining or analyzing the heading direction or position of the vehicle. When movement of the vehicle caused by an environmental condition differs from the intended movement of the vehicle along a path or route, that can compromise the accuracy of the dead reckoning technique because the output of the IMU sensors includes an indication of such movement.

SUMMARY

An illustrative example embodiment of a method of processing information regarding movement of a first vehicle based on information regarding movement of at least one second vehicle includes: receiving a communication from the second vehicle that includes information regarding movement of the second vehicle, determining that the movement of the second vehicle corresponds to movement of the first vehicle, identifying at least one feature of the movement of the second vehicle that indicates an environmental condition that affects the movement of the second vehicle, identifying a sensor indication of movement of the first vehicle that corresponds to the feature of the movement of the second vehicle, and excluding the identified sensor indication from information used to determine movement of the first vehicle.

In an example embodiment having at least one feature of the method of the previous paragraph, determining that the movement of the second vehicle corresponds to movement of the first vehicle includes determining that the first vehicle is following the second vehicle.

In an example embodiment having at least one feature of the method of any of the previous paragraphs, determining that the first vehicle is following the second vehicle includes determining a location of the second vehicle at each of a plurality of times, determining that a location of the first vehicle is similar to the determined location of the second vehicle at each of a plurality of subsequent times, and determining that a heading direction of the first vehicle is similar to a heading direction of the second vehicle.

In an example embodiment having at least one feature of the method of any of the previous paragraphs, the environmental condition comprises a condition of a road surface upon which the vehicles are travelling.

In an example embodiment having at least one feature of the method of any of the previous paragraphs, excluding the identified sensor indication comprises predictively discriminating the identified sensor indication from other sensor indications corresponding to other aspects of movement of the first vehicle.

In an example embodiment having at least one feature of the method of any of the previous paragraphs, determining that the movement of the second vehicle corresponds to movement of the first vehicle includes determining that the first vehicle and the second vehicle are travelling along a similar path by determining that the first vehicle is within a preselected range of the second vehicle, determining that a heading direction of the first vehicle is similar to a heading direction of the second vehicle, and determining that the environmental condition affects movement of the second vehicle and movement of the first vehicle in a similar manner.

In an example embodiment having at least one feature of the method of any of the previous paragraphs, the manner in which the environmental condition affects the movement of the second vehicle and the movement of the first vehicle includes causing at least an acceleration of the vehicle that is a lateral acceleration or a longitudinal acceleration.

In an example embodiment having at least one feature of the method of any of the previous paragraphs, the environmental condition comprises wind.

An example embodiment having at least one feature of the method of any of the previous paragraphs includes determining that a condition of at least a portion of the first vehicle causes a type of movement that is different from an intended movement of the first vehicle, and excluding a sensor indication of the type of movement from information used to determine movement of the first vehicle.

An example embodiment having at least one feature of the method of any of the previous paragraphs includes using an inertial measurement unit and a dead reckoning technique to determine movement of the first vehicle.

An illustrative example embodiment of a system for determining movement of a first vehicle based on information regarding movement of at least one second vehicle includes a receiver configured to receive a communication from the second vehicle, the received communication including information regarding movement of the second vehicle, a sensor that is configured to provide an indication of movement of the first vehicle, and a processor. The processor is configured to determine that the movement of the second vehicle corresponds to movement of the first vehicle, identify at least one feature of the movement of the second vehicle that indicates an environmental condition that affects the movement of the second vehicle, identify a sensor indication of movement of the first vehicle that corresponds to the feature of the movement of the second vehicle, and exclude the identified sensor indication from information used to determine movement of the first vehicle.

In an example embodiment having at least one feature of the system of the previous paragraph, the processor is configured to determine that the movement of the second vehicle corresponds to movement of the first vehicle by determining that the first vehicle is following the second vehicle.

In an example embodiment having at least one feature of the system of any of the previous paragraphs, the processor is configured for determining that the first vehicle is following the second vehicle by determining a location of the second vehicle at each of a plurality of times, determining that a location of the first vehicle is similar to the determined location of the second vehicle at each of a plurality of subsequent times, and determining that a heading direction of the first vehicle is similar to a heading direction of the second vehicle.

In an example embodiment having at least one feature of the system of any of the previous paragraphs, the environmental condition comprises a condition of a road surface upon which the vehicles are travelling.

In an example embodiment having at least one feature of the system of any of the previous paragraphs, the processor is configured to exclude the identified sensor indication by predictively discriminating the identified sensor indication from other sensor indications corresponding to other aspects of movement of the first vehicle.

In an example embodiment having at least one feature of the system of any of the previous paragraphs, the processor is configured to determine that the movement of the second vehicle corresponds to movement of the first vehicle when the first vehicle and the second vehicle are travelling along a similar path by determining that the first vehicle is within a preselected range of the second vehicle, determining that a heading direction of the first vehicle is similar to a heading direction of the second vehicle, and determining that the environmental condition affects movement of the second vehicle and movement of the first vehicle in a similar manner.

In an example embodiment having at least one feature of the system of any of the previous paragraphs, the manner in which the environmental condition affects the movement of the second vehicle and the movement of the first vehicle includes causing at least an acceleration of the vehicle that is a lateral acceleration or a longitudinal acceleration of the vehicle.

In an example embodiment having at least one feature of the system of any of the previous paragraphs, the environmental condition comprises wind.

In an example embodiment having at least one feature of the system of any of the previous paragraphs, the processor is configured to determine that a condition of at least a portion of the first vehicle causes a type of movement that is different from an intended movement of the first vehicle, and exclude a sensor indication of the type of movement from information used by the processor to determine movement of the first vehicle.

In an example embodiment having at least one feature of the system of any of the previous paragraphs, the sensor is part of an inertial measurement unit, and the processor is configured to use a dead reckoning technique to determine movement of the first vehicle.

The various features and advantages of at least one disclosed example embodiment will become apparent to those skilled in the art from the following detailed description. The drawings that accompany the detailed description can be briefly described as follows.

DETAILED DESCRIPTION

Figure 1:
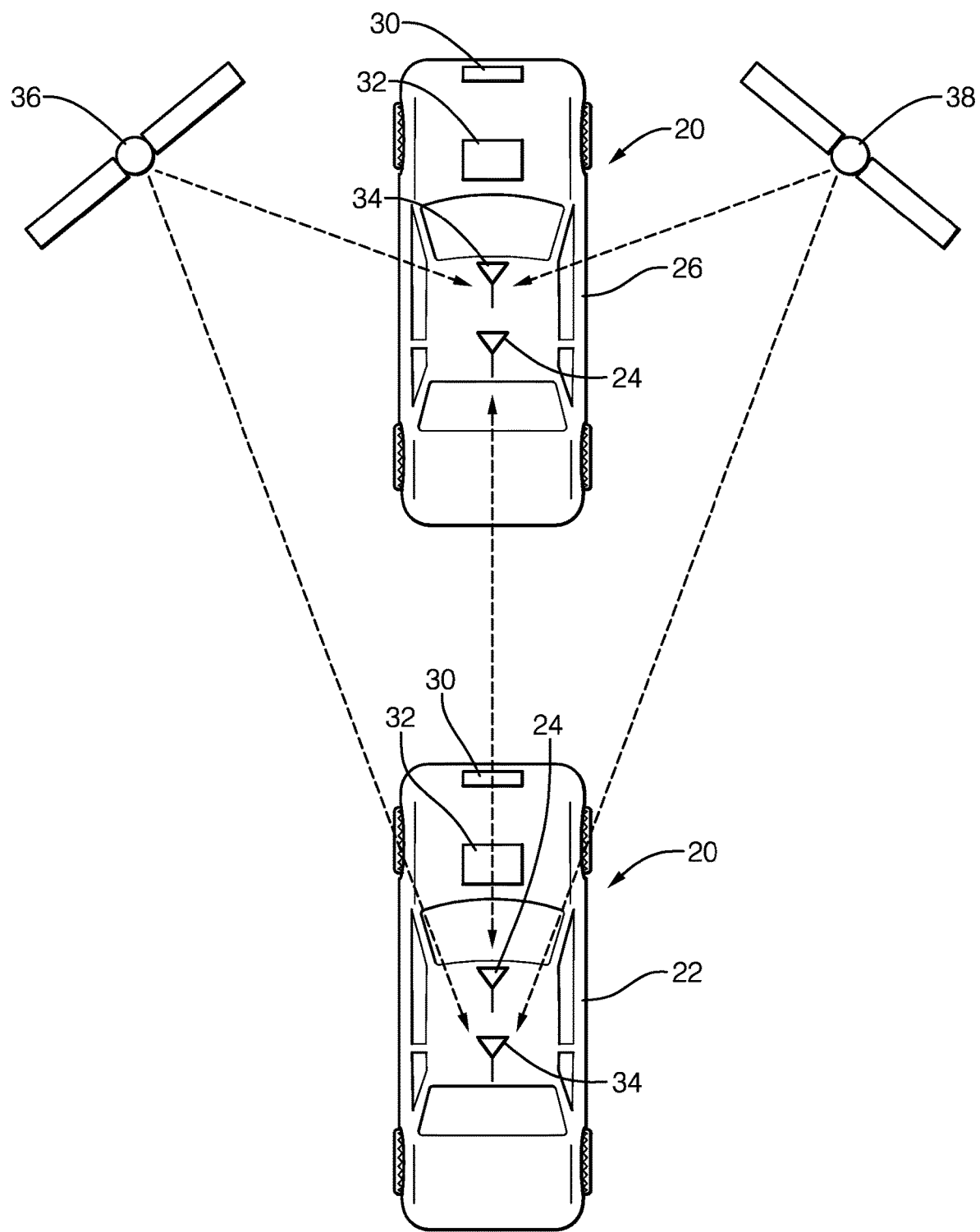
FIG. 1 schematically illustrates a system for determining movement of a vehicle.

FIG. 1 schematically illustrates a system 20 on a first vehicle 22. The system 20 includes a receiver 24 that is configured to receive a communication from a second vehicle 26 that is traveling nearby the first vehicle 22. The communication from the second vehicle 26 includes information regarding movement of that vehicle. In the illustrated example embodiment, the communication from the second vehicle 26 comprises a basic safety message (BSM) using a vehicle-to-vehicle (V2X) or dedicated short range communications (DSRC) protocol. The communication from the second vehicle 26 includes information such as the latitude and longitude or location of the second vehicle 26, its acceleration and yaw rate.

In the example of FIG. 1, the receiver 24 is part of a transceiver that is capable of two-way communication with other vehicles, such as the second vehicle 26. A similar transceiver 24 is provided on the second vehicle 26, which includes its own system 20 for determining movement of the second vehicle 26.

The system 20 includes a sensor 30 that detects movement of the first vehicle 22. The sensor 30 in the illustrated example embodiment is part of an inertial measurement unit (IMU). The sensor 30 includes accelerometers or gyroscopes in some embodiments. The sensor 30 provides information that is useful for a dead reckoning technique, for example.

A processor 32 includes a computing device and has associated memory. The processor 32 uses information from the sensor 30 and the communication received from the second vehicle 26 for purposes of determining movement of the first vehicle 22.

In the illustrated example embodiment of FIG. 1, the system 20 also includes a detector 34 that is capable of detecting signal from satellites 36 and 38. The processor 32 uses pseudo range information from detected satellite signals for purposes of determining the location of the first vehicle 22.

Figure 2:
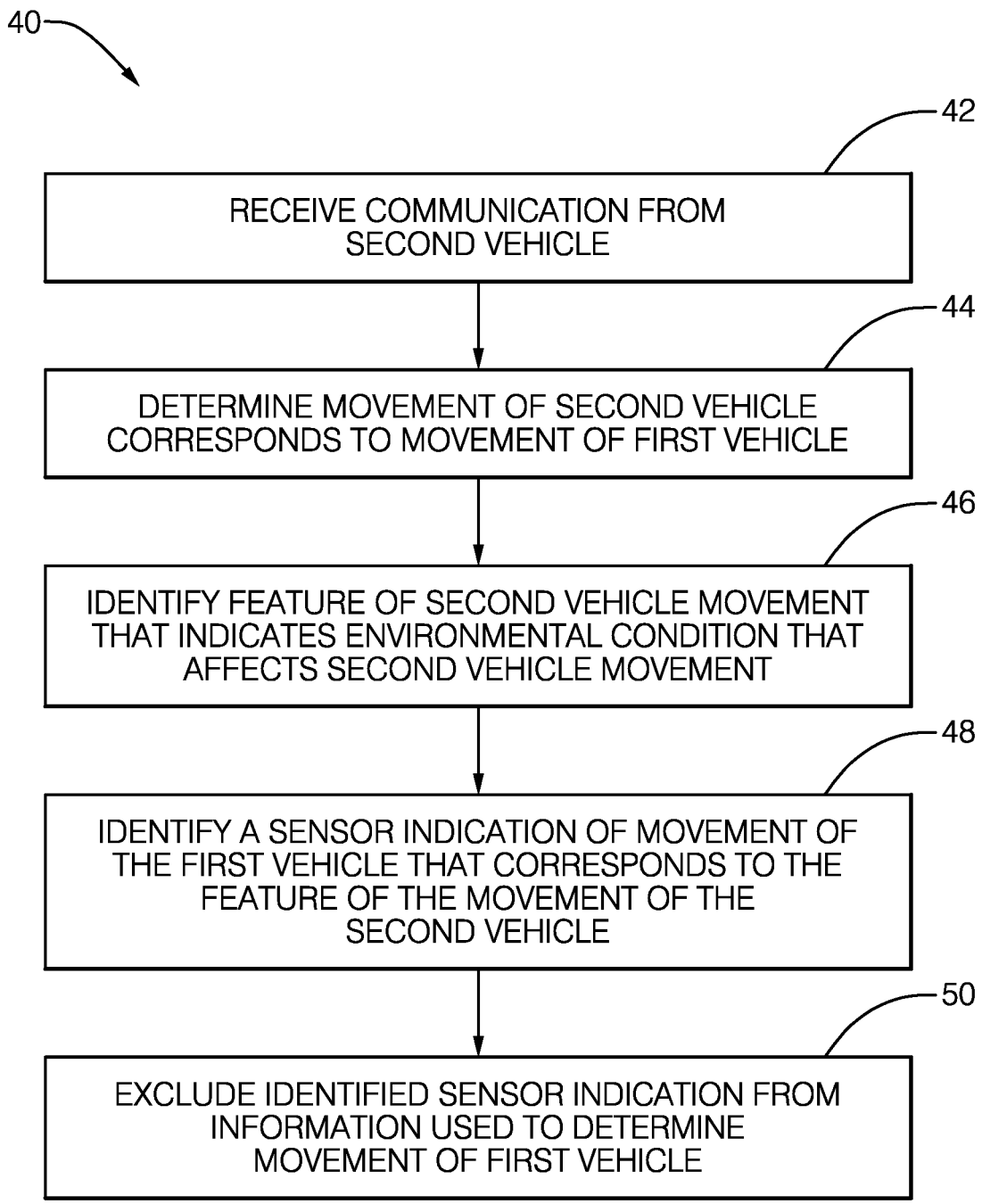
FIG. 2 is a flowchart diagram summarizing an example technique for determining movement of a vehicle.

FIG. 2 includes a flowchart diagram 40 that summarizes an example approach for determining movement of the first vehicle 22 based on information regarding movement of the second vehicle 26. At 42, the receiver 24 receives the communication from the second vehicle 26, which includes information regarding movement of the second vehicle 26. At 44, the processor 32 determines that movement of the second vehicle 26 corresponds to movement of the first vehicle 22.

The manner in which the movement of the second vehicle 26 corresponds to the movement of the first vehicle 22 may vary depending upon the particular situation. For example, sometimes the first vehicle 22 will be following the second vehicle 26, which is represented by the arrangement in FIG. 1. Under those circumstances, determining a correspondence between the vehicle movement includes determining that the first vehicle 22 is following the second vehicle 26. It may be possible in some situations to determine that the vehicles are traveling in the same lane or path along a road or route.

In an example embodiment, the processor 32 determines that the first vehicle 22 is following the second vehicle 26 by determining a location of the second vehicle 26 at each of a plurality of times. The processor 32 determines that a location of the first vehicle is similar to the determined location of the second vehicle at each of a plurality of subsequent times. When the first vehicle 22 is following the second vehicle 26, the locations should approximately match with a corresponding time delay between the time at which the second vehicle 26 reaches a particular location and the subsequent time at which the first vehicle 22 reaches that same location. When the heading direction of the first vehicle is similar to the heading direction of the second vehicle, that is a further indication used by the processor 32 for determining that the first vehicle 22 is following the second vehicle 26.

Determining that the first vehicle 22 is following the second vehicle 26 includes using information from at least one other type of sensor on or associated with the first and second vehicles. For example, an inertial measurement unit (IMU) provides acceleration information regarding different movements of the vehicle. When the first vehicle 22 is following the second vehicle 26, the IMUs of the two vehicles will demonstrate a similar or identical pattern of acceleration events. For example, lateral acceleration indications correspond to a crown in the road surface or a curve and vertical acceleration indications correspond to bumps in the road. When the IMU outputs correspond to each other within a selected tolerance, the processor 32 determines that the first vehicle 22 is on the same path as the second vehicle 26 and, therefore, following the second vehicle 26.

When the first vehicle 22 is following the second vehicle 26, the processor 32 can exclude sensor indications resulting from environmental conditions that affect or impact vehicle movement by predictively discriminating those sensor indications from other sensor indications. For example, when a temporary lateral acceleration occurs in the movement of the second vehicle at a location that the first vehicle 22 is approaching, the processor 32 can predictively expect such a lateral acceleration indication from the sensor 30 when the first vehicle 22 reaches that same location.

In other circumstances, the movement of the first vehicle 22 corresponds to movement of the second vehicle 26 when both vehicles are traveling along the same road or path but one is not necessarily following the other. The vehicles may be in different lanes or side-by-side but their relative positions are within a predetermined range of each other and they have similar heading directions and similar vehicle locations over time. The processor 32 is configured or suitably programmed to determine when there is correspondence between the movements of the vehicles for purposes of determining when information regarding movement of one of the vehicles is useful for processing information regarding movement of the other vehicle.

In some conditions, a plurality of vehicles will experience the same environmental condition at or about the same time. When the first vehicle 22 and the second vehicle 26 are traveling through an area where there is sufficient wind to impact the movement of the vehicle, both vehicles will experience the effect of that wind at about the same time. For example, both vehicles may experience a lateral acceleration, longitudinal acceleration, or a combination of both, depending on the direction of the wind. The processor 32 is able to identify such situations by determining that the first vehicle 22 and second vehicle 26 are within a preselected range of each other, that their heading directions are similar and that the environmental condition affects movement of both vehicles in a similar manner.

At 46, the processor 32 identifies a feature of the second vehicle movement that indicates an environmental condition that affects the movement of the second vehicle 26. Examples of such environmental conditions include a condition of a road surface and wind. Road surface conditions, such as potholes, inclines or a change in the crown of the road surface can affect the sensor output from an IMU. The sensor output in those conditions includes information regarding some movement of the vehicle that was caused by the environmental condition rather than by the vehicle being driven along an intended pathway. For example, when at least one wheel of a vehicle hits a pothole in a road, the vehicle may experience a vertical acceleration. When the sensor or IMU detects that type of acceleration or other vehicle movement, such information would potentially cause inaccuracies in the determined vehicle heading direction based on the data from the IMU.

In some example embodiments when the processor 32 identifies an environmentally caused feature of the second vehicle movement at 46, the processor 32 keeps track of the location of the second vehicle 26 when that feature of the second vehicle movement occurred. That data is useful for anticipating when the first vehicle 22 will encounter that environmental condition when the first vehicle 22 is following the second vehicle 26.

At 48, the processor 32 identifies a sensor indication from the sensor 30 on the first vehicle 22 regarding movement of the first vehicle 22 that corresponds to the feature of the movement of the second vehicle 26 that was identified at 46. In other words, at 48 the processor 32 determines when the first vehicle 22 is subsequently affected by the environmental condition that resulted in the feature of the movement of the second vehicle 26 caused by that same environmental condition. At 50, the processor 32 excludes the sensor indication identified at 48 from information used to determine movement of the first vehicle 22. By identifying a vertical acceleration caused by hitting a pothole, for example, the corresponding sensor indication can be removed from or excluded from the information used by the processor 32 for a dead reckoning technique or another way in which the processor 32 determines movement of the first vehicle 22. Excluding information pertaining to environmental conditions that affect movement of a vehicle in a manner that is inconsistent with or different from the intended movement of the vehicle along a path or route provides for more accurate vehicle movement and location determination. For example, heading direction information based on sensor indications from an IMU will better represent the actual heading direction of the vehicle because temporary effects of environmental conditions are excluded from or filtered out from the information used for determining the movement of the vehicle.

Using the information from the second vehicle 26 allows for the processor 32 to determine when an indication of movement of the first vehicle 22 from the sensor 30 can or should be excluded from the information used for determining the movement of the first vehicle 22 to avoid any potential error or negative impact on that determination.

The example embodiment includes an ability to determine when a condition of a portion of the first vehicle 22 causes a type of movement that is different from the intended movement of that vehicle. The processor 32 excludes a sensor indication of that type of movement from the information used to determine the movement of the first vehicle 22. For example, one or more components of the vehicle 22, such as an unbalanced wheel, may cause vibration. The processor 32 is configured to be able to recognize a lateral vibration that occurs during certain wheel ticks on a certain wheel. Such information is available from a wheel sensor over a communication bus on the vehicle 22, for example. The processor 32 recognizes such movement as a noise source and excludes it from the information used for dead reckoning or other determinations of movement of the first vehicle 22. For example, the processor 32 is configured to monitor wheel speed, wheel ticks and steering angle to recognize a pattern of vibration that is being caused by a condition of a component on the vehicle 22 and exclude information regarding that type of movement from the data or information used to determine the movement of the vehicle 22 for dead reckoning or other purposes.

In the disclosed embodiments, information regarding movement of another vehicle that results from an environmental condition, such as the road surface or wind, allows for filtering out or excluding such movement from the determination of vehicle movement. Heading direction and position determinations, for example, are more accurate when environmental influences on vehicle motion are excluded.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of processing information regarding movement of a first vehicle based on information regarding movement of at least one second vehicle, the method comprising:
   receiving, by a receiver supported on the first vehicle, a communication from a transmitter supported on the second vehicle, the received communication including a location of the second vehicle and information generated by an inertial measurement unit (IMU) of the second vehicle indicating movement of the second vehicle corresponding to temporary lateral or vertical acceleration of the second vehicle experienced by the second vehicle at the location, the temporary lateral or vertical acceleration being caused by an environmental condition encountered by the second vehicle at the location;
   using a processor to process the information from the received communication and determine that the first vehicle is following the second vehicle while traveling on a road;
   using information from an IMU of the first vehicle to identify a sensor indication of movement of the first vehicle indicating temporary lateral or vertical acceleration of the first vehicle experienced by the first vehicle at the location that corresponds to the temporary lateral or vertical acceleration experienced by the second vehicle at the location, the temporary lateral or vertical acceleration experienced by the first vehicle being caused by the first vehicle encountering the same environmental condition that affected the movement of the second vehicle at the location;
   excluding the identified sensor indication of the movement of the first vehicle that corresponds to the temporary lateral or vertical acceleration experienced by the first vehicle at the location caused by the first vehicle encountering the same environmental condition that affected the movement of the second vehicle from information used by the processor to determine movement of the first vehicle;
   determining movement of the first vehicle, using a dead reckoning technique, based on remaining non-excluded sensor information from the IMU of the first vehicle indicating movement of the first vehicle at the location that does not include the identified and excluded sensor indication of the movement of the first vehicle; and
   controlling at least one system of the vehicle based on the determined movement of the first vehicle by providing driver assistance or autonomous vehicle control.

2. The method of claim 1, wherein determining that the first vehicle is following the second vehicle includes:
   determining the location of the second vehicle at each of a plurality of times;
   determining that a location of the first vehicle is similar to the determined location of the second vehicle at each of a plurality of subsequent times; and
   determining that a heading direction of the first vehicle is similar to a heading direction of the second vehicle.

3. The method of claim 1, wherein the environmental condition comprises a condition of a road surface upon which the vehicles are travelling.

4. The method of claim 1, wherein excluding the identified sensor indication comprises predictively discriminating the identified sensor indication from other sensor indications corresponding to other aspects of movement of the first vehicle.

5. The method of claim 1, further comprising:
   determining that the first vehicle is within a preselected range of the second vehicle,
   determining that a heading direction of the first vehicle is similar to a heading direction of the second vehicle, and
   determining that the environmental condition affects movement of the second vehicle and movement of the first vehicle in a similar manner.

6. The method of claim 1, wherein the environmental condition comprises wind.

7. The method of claim 1, comprising
   determining that a condition of at least a portion of the first vehicle causes a type of movement that is different from an intended movement of the first vehicle, and
   excluding a sensor indication of the type of movement from information used to determine movement of the first vehicle.

8. A system for determining movement of a first vehicle based on information regarding movement of at least one second vehicle, the system comprising:
   a receiver supported on the first vehicle, the receiver being configured to receive a communication from a transmitter supported on the second vehicle, the received communication including a location of the second vehicle and information generated by an inertial measurement unit (IMU) of the second vehicle indicating movement of the second vehicle corresponding to temporary lateral or vertical acceleration of the second vehicle experienced by the second vehicle at the location, the temporary lateral or vertical acceleration being caused by an environmental condition encountered by the second vehicle at the location;
   an IMU configured to detect movement of the first vehicle and to provide an indication of movement of the first vehicle; and
   a processor comprising a computing device and associated memory, the processor being configured to process the received communication to determine that the first vehicle is following the second vehicle while traveling on a road;
   the processor being further configured to process the indication of movement from the IMU of the first vehicle to
      identify a sensor indication of movement of the first vehicle indicating temporary lateral or vertical acceleration of the first vehicle experienced by the first vehicle at the location that corresponds to the temporary lateral or vertical acceleration experienced by the second vehicle at the location, the temporary lateral or vertical acceleration experienced by the first vehicle being caused by the first vehicle encountering the same environmental condition that affected the movement of the second vehicle at the location;
exclude the identified sensor indication of the movement of the first vehicle that corresponds to the temporary lateral or vertical acceleration experienced by the first vehicle at the location caused by the first vehicle encountering the same environmental condition that affected the movement of the second vehicle from information used to determine movement of the first vehicle;
determine movement of the first vehicle, using a dead reckoning technique, based on remaining non-excluded sensor information from the IMU of the first vehicle indicating movement of the first vehicle at the location that does not include the identified and excluded sensor indication of the movement of the first vehicle; and
control at least one system of the vehicle based on the determined movement of the first vehicle by providing driver assistance or autonomous vehicle control.

9. The system of claim 8, wherein the processor is configured for determining that the first vehicle is following the second vehicle by:
determining the location of the second vehicle at each of a plurality of times;
determining that a location of the first vehicle is similar to the determined location of the second vehicle at each of a plurality of subsequent times; and
determining that a heading direction of the first vehicle is similar to a heading direction of the second vehicle.

10. The system of claim 8, wherein the environmental condition comprises a condition of a road surface upon which the vehicles are travelling.

11. The system of claim 8, wherein the processor is configured to exclude the identified sensor indication by predictively discriminating the identified sensor indication from other sensor indications corresponding to other aspects of movement of the first vehicle.

12. The system of claim 8, further comprising:
determining that the first vehicle is within a preselected range of the second vehicle,
determining that a heading direction of the first vehicle is similar to a heading direction of the second vehicle, and
determining that the environmental condition affects movement of the second vehicle and movement of the first vehicle in a similar manner.

13. The system of claim 8, wherein the environmental condition comprises wind.

14. The system of claim 8, wherein the processor is configured to
determine that a condition of at least a portion of the first vehicle causes a type of movement that is different from an intended movement of the first vehicle, and
exclude a sensor indication of the type of movement from information used by the processor to determine movement of the first vehicle.

* * * * *